F. J. GLEASON.
RUBBER COMPOUND AND METHOD OF PRODUCING THE SAME.
APPLICATION FILED NOV. 20, 1915.
1,257,698. Patented Feb. 26, 1918.
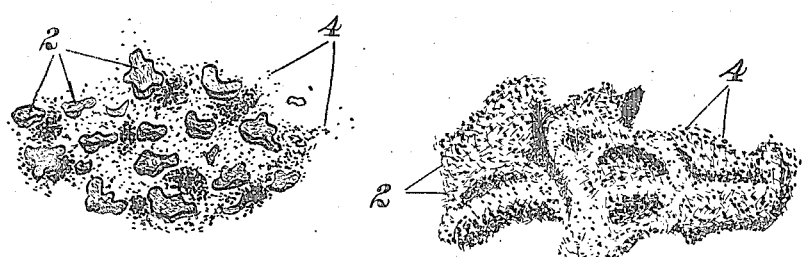
Fig.1. Fig.2.
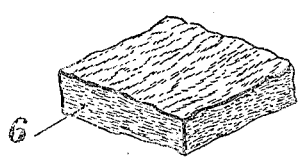 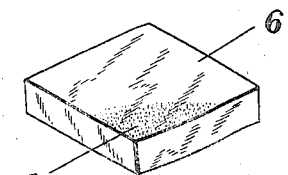
Fig.3. Fig.4.
INVENTOR_
Frederick J. Gleason
By his attorney
Putnam Putnam & Bell

UNITED STATES PATENT OFFICE.

FREDERICK J. GLEASON, OF WALPOLE, MASSACHUSETTS, ASSIGNOR TO STANDARD WOVEN FABRIC COMPANY, OF FRAMINGHAM, MASSACHUSETTS, A CORPORATION OF MASSACHUSETTS.

RUBBER COMPOUND AND METHOD OF PRODUCING THE SAME.

1,257,698. Specification of Letters Patent. Patented Feb. 26, 1918.

Application filed November 20, 1915. Serial No. 62,620.

*To all whom it may concern:*

Be it known that I, FREDERICK J. GLEASON, a citizen of the United States, residing at Walpole, in the county of Norfolk and State of Massachusetts, have invented certain Improvements in Rubber Compounds and Methods of Producing the Same, of which the following description, in connection with the accompanying drawings, is a specification, like reference characters on the drawings indicating like parts in the several figures.

This invention relates to compounds and compositions of matter in which rubber or allied substances, hereinafter for convenience referred to as rubber, form essential ingredients, and which usually are designated as rubber compounds. More specifically it relates to compositions of this general character in which the rubber is mixed with fibrous material of some character, and to methods of producing such mixtures of rubber and fibrous material.

It has been proposed heretofore to combine cotton and rubber in such a manner as to distribute the cotton throughout the body of rubber and obtain in the resulting product the mechanical advantages of the cotton fiber. The attempts along this line, however, have not, so far as I am aware, been successful, due chiefly to the fact that it has been found impossible to mix the cotton and rubber together uniformly; that is, the cotton tends to "bunch" to such an extent that a homogeneous product can not be made. I have discovered a method of obviating this difficulty and of producing a composition of rubber and cotton in which the cotton fiber is present in a very finely divided state and is distributed substantially uniformly throughout the resulting product. This method I propose to utilize in producing a new product capable of being used in the manufacture of rubber goods and also as an important part of a new process for producing rubber goods and articles of a novel composition. These new processes and the products which are produced by them constitute the features of the present invention.

The manner in which I now prefer to carry the invention into effect will be described, reference being made to the accompanying drawings, in which—

Figure 1 is a perspective view showing the cotton and rubber at one stage of the mixing operation;

Fig. 2 is a view similar to Fig. 1, showing the rubber and cotton more intimately mixed and in a more finely divided condition, in which condition the mixture is capable of being used as an ingredient of numerous formulas for producing rubber goods;

Fig. 3 is a perspective view showing a piece of material produced in accordance with this invention and prior to being vulcanized; and Fig. 4 is a perspective view showing part of a finished sheet of goods made in accordance with this invention.

According to the method that I now regard as preferable, cotton and ground rubber scrap are first milled together in proportions depending on the nature of the use to which the goods are to be put, about equal parts by weight, of ground scrap rubber and cotton being used for a large variety of purposes. The cotton may be in a raw form or in the form of cottonbatting and the scrap rubber should be ground up or milled in the usual manner so that it is in a fairly fine condition. The cotton is fed, a little at a time, between rolls of an ordinary mill used in the manufacture of rubber goods, the rubber being introduced between the rolls with the cotton so that the two will be crushed together by the rolls. Preferably a differential mill is used, that is, one roll revolves at a higher speed than its companion and the rolls may be either heated or cold. This operation at first crushes the cotton, rendering it very hard and flaky; but after this mixture has been run through the mill several times, say seven or eight, the size of the cotton flakes is reduced and they become more thoroughly mixed with the rubber. At this time, however, the flakes of cotton are rather hard and brittle and present little of the fluffy or fibrous appearance that cotton has in its ordinary form. Fig. 1 shows somewhat roughly the appearance of the mixture at this time, 2 indicating the flakes of cotton and 4 the particles of rubber. Often times the rubber particles tend to hang together in clusters, as will be readily understood by those skilled in this art.

When this mixture has been reduced to a fairly uniform state, it is removed from the mill and ground in some suitable manner, an ordinary grist mill serving admirably for this purpose. This mill, as is well understood, consists of two disk-like stones mounted for rapid relative rotation against each other, the cotton or other material to be milled, being delivered to the stones at their central portions and caused to travel outwardly by centrifugal action. This grinding operation pulverizes the rubber and completely changes the appearance and texture of the cotton. While the cotton goes into the mill in a hard, flaky condition, it comes out of the mill in a very fluffy, finely divided state with the particles of rubber, which have been reduced in size during this operation, mixed substantially uniformly with the cotton. Fig. 2 shows in a general way the appearance of the mixture at this time.

This composition may now be used as one ingredient in any one of a number of formulas designed to produce a compound having the desired properties. The previous attempts along this line have failed in getting the rubber and cotton into the condition in which it comes from the grist mill; and I attribute the success of this method primarily to the fact that whereas former processes proposed have usually required the milling together of crude rubber and cotton, the present process overcomes the difficulty heretofore experienced by crushing, grinding and mixing the cotton with vulcanized rubber. The exact reason for the difference in action of crude rubber and vulcanized rubber in this respect I am unable to explain but I know that in actual practice this process produces the required results.

The processes and formulas in which the product in its present condition is used will, of course, vary with the requirements of each individual case. A method of procedure which produces a compound that is found to be very satisfactory for many purposes, as for instance for shoe heels and soles, consists in milling together 14 pounds of rubber shoddy or reclaimed rubber 13½ pounds of pure Pará rubber, 2 pounds of pulverized zinc oxid and 5 pounds of sulfur. When these materials have been thoroughly mixed together and reduced to a finely divided state, the bath so produced is added to 16 pounds of the mixture of ground scrap and cotton produced in the manner above described, and the two mixtures are then milled together. This operation may be performed in the usual type of mill used in this art. The materials composing the two batches mix very readily with each other and a homogeneous compound is produced in which the cotton fiber is very uniformly distributed. At the end of the final milling operation the rolls of the mill are set far enough apart to run the material out in a sheet of the required thickness. Parts of the required size and shape are then cut or stamped out of the sheet produced in this manner, or the material is molded to form parts of the desired shapes and sizes, and these parts are then placed in suitable molds and vulcanized. Fig. 3 indicates, as well as can be shown in a drawing, a part 6 of a sheet of material made in this manner as it comes from the mill and prior to being vulcanized. It, of course, has the rough surface usual in rubber goods, at this stage of manufacture and also has a peculiar "felty" appearance which appears to be due to the presence of the cotton although the cotton fibers are scarcely visible to the naked eye. They can, however, be clearly seen with the aid of an ordinary reading glass. Of course, the unvulcanized rubber and other materials desired to effect vulcanization, which are mixed with the composition of vulcanized rubber and cotton fiber as it comes from the grist mill, as above described, will vary in character and quantity with the requirements of the goods or articles to be produced. The formula above given, however, produces a rubber compound that is satisfactory for a great variety of purposes. This formula and the foregoing description discloses the invention with such particularity that any one skilled in this art will have no difficulty in producing goods of this character and making such modifications in the formula as may be desired to meet the requirements of manufacture of any rubber goods in which it is desired to mix fiber with the rubber.

The degree of pressure and temperature used in the vulcanizing operation and the length of time required to perform this operation will also vary somewhat with the requirements of particular cases, as will be readily understood by those skilled in this art. I find that very satisfactory results are obtained when the process above described is followed, by subjecting the goods during the vulcanizing operation to about two thousand pounds pressure while applying steam at about forty-five pounds pressure and limiting this operation to a period of approximately forty-five minutes.

If the milling and grinding operations have been thoroughly carried out and the procedure followed substantially as above described in other respects, it will be found that when the compound is vulcanized a homogeneous product is produced. If a piece of the finished product, as indicated for instance at 6 in Fig. 4, has a portion of its surface buffed, as shown at a, Fig. 4, and is then observed through a reading glass, it will be found that the cotton fibers stand up from the surface in minute shreds and that they are substantially uniformly distributed. The cotton fiber is so finely divided that it can be seen with the naked eye only upon very careful observation although readily seen through a reading glass. Although the goods made in this manner may, upon casual observation, seem to have substantially the appearance of ordinary rubber goods, it is found that they have greater wearing qualities than rubber goods in which there is no fiber, but in which there may be a considerably higher percentage of pure rubber. Also that the goods are materially lighter in weight than rubber goods made up under the usual formulas. These properties, and the fact that the material presents a wearing surface having greater friction than an ordinary piece of rubber, render this material particularly adapted to meet the requirements of rubber shoe heels and soles, vehicle tires and many other articles.

While I have above described new forms of rubber compounds and processes of producing them which I now regard as preferable, it is obvious that the invention is not limited to the exact details described but that considerable latitude is permissible in practising the invention. Furthermore, while I have particularly described the invention as applied to combining cotton and rubber, I consider it within the scope of the invention to combine rubber with other fibrous material in substantially the manner described.

Having thus described my invention, what I claim as new and desire to secure by Letters Patent of the United States is:

1. A composition of matter consisting of a mixture of ground vulcanized rubber and cotton.

2. A composition of matter consisting of a substantially uniform mixture of pulverized vulcanized rubber and fiber in a finely divided state.

3. A composition of matter consisting of a substantially uniform mixture of pulverized vulcanized rubber and cotton fiber in a finely divided state.

4. The herein described process of mixing rubber and fibrous material, which consists in milling the fibrous material and vulcanized rubber together, and then grinding the resulting mixture.

5. The herein described process of mixing rubber and cotton, which consists in milling the cotton and vulcanized rubber together, and then grinding the resulting mixture.

6. The herein described process of mixing rubber and cotton, which consists in milling the cotton and ground vulcanized rubber together until the cotton has become mixed with the rubber and is in a hard flaky condition, and then grinding the resulting mixture between grinding devices operating at such a speed as to pulverize the rubber and reduce the cotton to a finely divided and fluffy condition.

7. The herein described process of producing a rubber compound, which consists in milling together cotton and vulcanized rubber, then grinding the resulting mixture, mixing with the composition so produced unvulcanized rubber and materials desirable to effect vulcanization, and then vulcanizing the compound so produced.

8. The herein described process of producing a rubber compound, which consists in milling together cotton and ground vulcanized rubber in substantially the proportions described until the cotton and rubber have become thoroughly mixed and the cotton is in a hard, flaky condition, then grinding the resulting mixture until the rubber is pulverized and the cotton is intimately mixed with it and is in a finely divided and fluffy condition, mixing the composition so produced with unvulcanized rubber and materials desirable for effecting vulcanization in substantially the proportions described, shaping the resulting compound to approximately the form desired in the finished article, and finally vulcanizing the mass so shaped to produce the finished article.

In testimony whereof I have signed my name to this specification.

FREDERICK J. GLEASON.